Patented Mar. 22, 1938

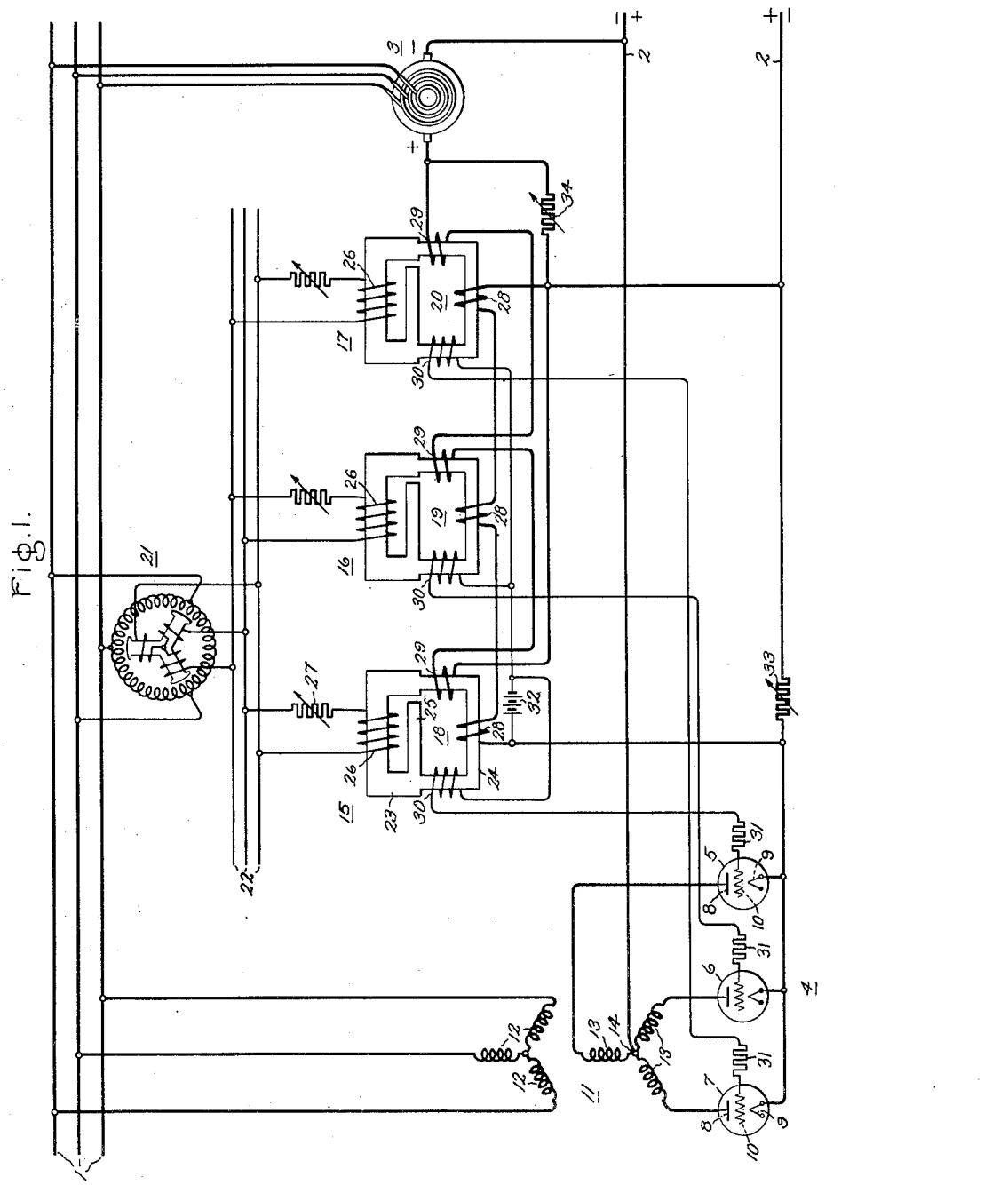

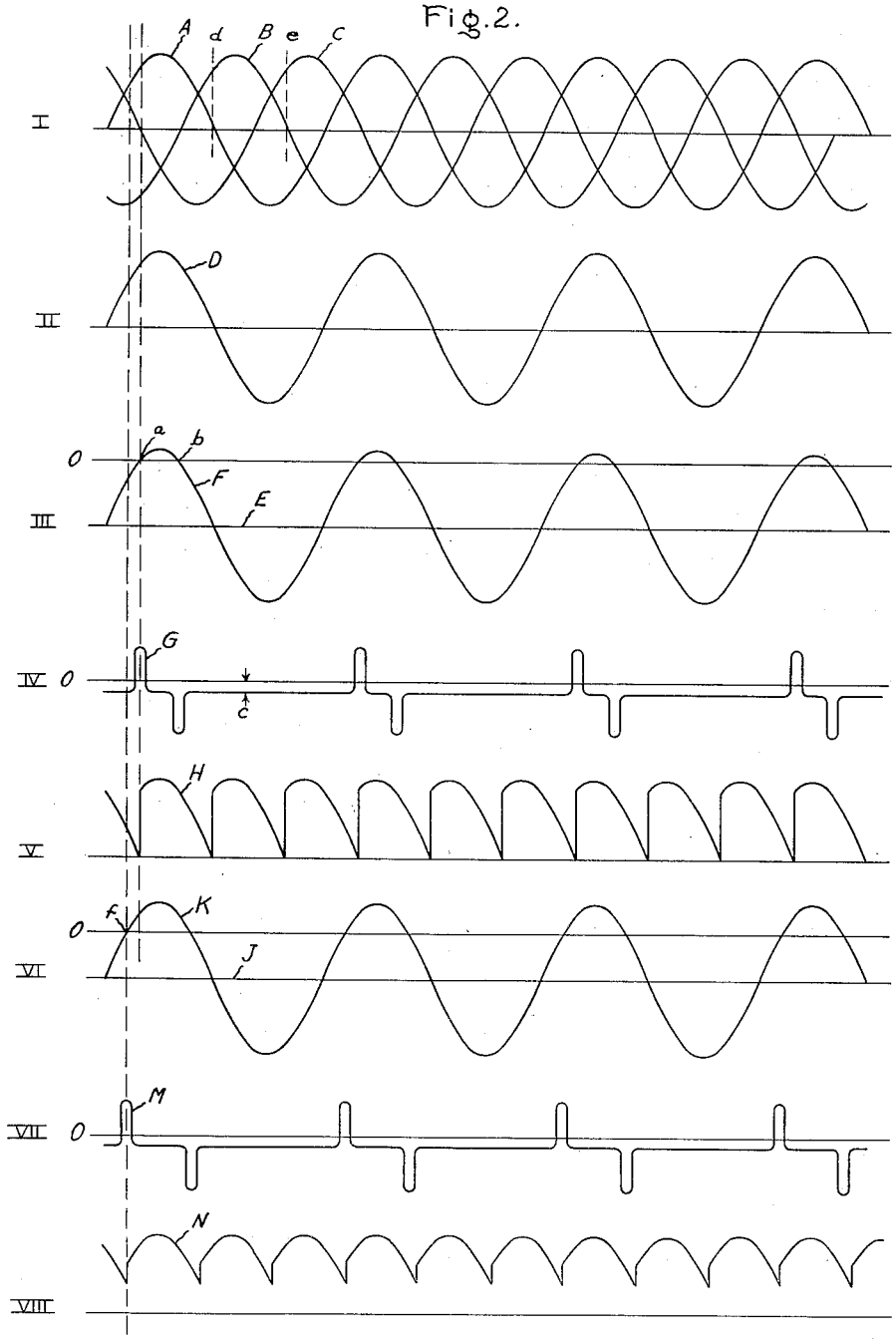

2,112,051

UNITED STATES PATENT OFFICE 2,112,051

ELECTRIC CONTROL SYSTEM

August Schmidt, Jr., Schenectady, N. Y., assignor to General Electric Company, a corporation of New York Application December 9, 1936, Serial No. 114,986

6 Claims. (Cl. 171—224)

My invention relates to electric control systems and more particularly to circuits for operating electric valve means and dynamo-electric machines in parallel.

It has become apparent that there is a decided need for control circuits suitable for translating systems in which a plurality of different translating devices such as electric valve means and dynamo-electric machines are intended to operate in parallel. The control circuits, in order to be susceptible of a reasonable range of application, must be simple in construction and arrangement, and must be capable of responding rapidly and precisely to load or supply circuit conditions to effect a predetermined division of load between the electric valve means and the dynamo-electric machine. Heretofore, the above desirable features have not been found in the available control circuits for performing these functions.

It is an object of my invention to provide a new and improved electric translating system.

It is another object of my invention to provide a new and improved electric control circuit.

It is a further object of my invention to provide a new and improved control system for operating electric valve apparatus and dynamo-electric machines in parallel.

In accordance with the illustrated embodiment of my invention, I provide a new and improved control system for operating electric valve apparatus and dynamo-electric machines in parallel. More specifically, I provide a system in which an electric valve means and a dynamo-electric machine are operated in parallel to transmit energy between a load circuit and a supply circuit. I have chosen to represent my invention as applied to a system including a synchronous converter and an electric valve means connected in parallel to transmit energy between an alternating current circuit and a direct current circuit. A control circuit is employed to impress on control members of the electric valve means an alternating voltage the phase of which varies relative to the voltage impressed across the electric valve means conjointly in accordance with the current supplied by the electric valve means and the current supplied by the synchronous converter to maintain a predetermined division of load.

For a better understanding of my invention reference may be had to the following description taken in connection with the accompanying drawings and its scope will be pointed out in the appended claims. Fig. 1 of the accompanying drawings diagrammatically illustrates an embodiment of my invention as applied to an electric translating system in which an electric valve means and a synchronous converter are operated in parallel and Fig. 2 shows certain operating characteristics thereof.

Referring to Fig. 1 of the accompanying drawings, I have diagrammatically shown my invention as applied to an electric translating system including a plurality of different translating devices for transmitting energy between an alternating current circuit 1 and a direct current circuit 2. A dynamo-electric machine 3, which for the purpose of explaining my invention is shown as a synchronous rotary converter, is connected to operate in parallel with an electric valve means 4 including electric valves 5, 6 and 7. Each of the electric valves 5, 6 and 7 includes an anode 8, a cathode 9 and a control member 10 and is preferably of the type employing an ionizable medium such as a gas or a vapor. Electric valves 5, 6 and 7 are connected to the alternating current circuit 1 through a transformer 11 having primary windings 12 and secondary windings 13. Secondary windings 13 are connected to provide a neutral connection 14 which is connected to one terminal of the direct current circuit 2 and to the corresponding terminal of the direct current circuit of the synchronous converter 3. While I have diagrammatically shown my invention as applied to an electric translating circuit in which the dynamo-electric machine is a synchronous converter, it should be understood that my invention in its broader aspects could be applied to electric translating systems generally where it is desired to operate electric valve apparatus and other types of dynamo-electric machines in parallel.

In order to provide an arrangement for controlling the electric valve means 4 to maintain a predetermined division of load between the electric valve means 4 and the synchronous converter 3, I provide a plurality of control circuits 15, 16 and 17 including inductive devices 18, 19 and 20 respectively. The circuits 15, 16 and 17 may be energized from any suitable source of alternating current correlated in the proper manner in frequency and phase relative to the voltage of the alternating current circuit 1. In the particular arrangement shown in Fig. 1, the control circuits 15, 16 and 17 are energized from the alternating current circuit 1 through any conventional phase shifting arrangement such as the rotary phase shifter 21. The inductive devices 18, 19 and 20 are energized from a three-phase output circuit 22 of the rotary phase shifter 21 and each is energized in accordance with the voltage of a different phase of the three-phase alternating current circuit 22.

The inductive devices 18, 19 and 20 are substantially similar in construction and arrangement, and for the purposes of describing these devices, one of the devices, such as the inductive device 18 will be considered in particular. The inductive device 18 includes a core member 23 having a saturable path 24 and a member 25 arranged to shunt the saturable portion 24 when the magnetization of the path 24 exceeds a predetermined value. The saturable portion or path 24 may be constructed of any suitable material, such as a material which saturates very rapidly for values of flux above a predetermined value. A winding 26 which is energized from one phase of the alternating current circuit 22 serves to impress on the core member 23 an alternating magnetomotive force. The winding 26 may be energized through a variable resistance 27 which serves to adjust the voltage impressed thereon. To impress on the core member 23 a unidirectional magnetomotive force which varies in magnitude in accordance with an electrical condition of the electric valve means 4, such as the current supplied by the electric valves 5, 6 and 7, I provide a control winding 28 which is wound around or inductively associated with the saturable path 24 of the inductive device 18. A control winding 29, which is oppositely disposed relative to the winding 28, is also inductively associated with the saturable path 24 of the inductive device 18 and serves to impress upon the core member 23 a unidirectional magnetomotive force in opposition to the magnetomotive force of winding 28 and which varies in magnitude in accordance with an electrical condition such as the current conducted by the synchronous converter 3. A winding 30 is also wound on the saturable path 24 or conductively associated therewith and provides an alternating voltage of peaked wave form, the phase of which varies relative to the voltage-impressed anode 8 and cathode 9 of electric valve 5 conjointly in accordance with the resultant unidirectional magnetomotive force in the core member 23, or in other words varies conjointly in accordance with the division of load between the electric valve means 4 and the rotary converter 3. The winding 30 impresses the voltage of peaked wave form on control member 10 of electric valve 5 through a current limiting resistance 31. Any suitable source of voltage, such as a battery 32 may be employed to impress on the control members 10 of electric valves 5, 6 and 7 a negative biasing potential.

Windings 28 of the inductive devices 18, 19 and 20 may be connected in series relation with each other. In the particular arrangement shown, these windings are energized in accordance with the voltage appearing across an adjustable resistance 33 which is connected in series relation with the electric valve means 4. In like manner the control windings 29 of inductive devices 18, 19 and 20 may be connected in series relation across an adjustable resistance 34 which is connected in series relation with the direct current circuit of the synchronous converter 3. While for the purposes of explaining my invention I have shown the windings 29 as being energized in accordance with the current of the direct current circuit of the synchronous converter 3, it will be understood that I may employ other suitable means such as a conventional rectifier which energizes the windings 29 in accordance with another electrical condition of the synchronous converter 3, such as the current in the alternating current circuit of the converter. Furthermore, it should be understood that the control windings 28 of inductive devices 18, 19 and 20 may also be energized through suitable rectifying devices in accordance with an alternating quantity of the electric valve means 4 or associated circuit.

The operation of the embodiment of my invention diagrammatically shown in Fig. 1, will be explained by considering the electric translating system when the electric valve means 4 and the rotary synchronous converter 3 are operating in parallel relation to transmit energy from the alternating current circuit 1 to the direct current circuit 2. Let it be assumed that it is desired to maintain a predetermined division of load between the electric valve means 4 and the synchronous converter 3; more specifically, let it be assumed that it is desired to maintain an equal division of load between the electric valve means 4 and the synchronous converter 3. As it is well understood by those skilled in the art, the electric valves 5, 6 and 7 may be rendered conductive by impressing upon the control members 10 potentials sufficiently positive relative to the cathodes during those intervals in which the anodes 8 are positive relative to the cathodes 9. Furthermore, it will be understood that the conductivity of the electric valves 5, 6 and 7, or, in other words, the current which these valves conduct will be substantially zero when the alternating voltages impressed upon the control members 10 are in substantial phase opposition to the alternating voltages impressed upon the anodes 8. On the other hand, the conductivity of electric valves 5, 6 and 7, and hence the current conducted by these electric valves will be a maximum when there is substantial phase coincidence between the alternating voltages impressed upon the control members 10 and the alternating voltages impressed upon the associated anodes 8. For the purpose of explaining my invention, let it be assumed that the adjustable resistance 33 is adjusted so that the current supplied to the control windings 28 is greater than the current supplied to the control windings 29, and let it be assumed further that the windings 28 and 29 are arranged relative to the instantaneous polarizations of the windings 26 so that an increase in the energization of the windings 28, or in other words, an increase in the resultant unidirectional magnetomotive forces will effect a retardation in phase of the alternating voltages induced in windings 30 of inductive devices 18, 19 and 20 relative to the voltages impressed on the various anodes 5.

The inductive devices 18, 19 and 20 by virtue of the peculiar design of the core members 23 serve to induce voltages of peaked wave form in the windings 30. Neglecting the effect of the unidirectional magnetomotive forces impressed on the core member 23 by control windings 28 and 29, the maximum value of the flux threading the saturable path 24 of each of the core members 23 will remain substantially constant during each half cycle of alternating magnetomotive force. In other words, due to the fact that the saturable path 24 becomes saturated, there will be induced in the winding 30 a voltage of peaked wave form at the time when the magnetomotive force passes through the zero value. The magnetic path 25 serves to shunt the flux around the saturable path 24 when the path 24 becomes saturated maintaining therein a substantially constant value of flux during each half cycle. The effect of the resultant unidirectional magnetomotive force impressed on the core member 23 by the control windings 28 and 29 is to shift the time at which the resultant magnetomotive force passes through zero and hence to effect a shift in the phase of the voltage of peaked wave form relative to the voltage impressed on winding 26.

The operating characteristics represented in Fig. 2 will be considered in explaining the operation of the embodiment of my invention shown in Fig. 1. In Diagram I of Fig. 2, curves A, B and C represent the three-phase alternating voltages impressed upon electric valves 5, 6 and 7, and curve D of Diagram II represents the magnetomotive force impressed on core member 23 of inductive device 18. This particular phase position of the magnetomotive force impressed on core member 23 of inductive device 18 is obtained by adjustment of the rotary phase shifter 21. In Diagram III, the line E represents the negative unidirectional magnetomotive force impressed on the core member 23, or in other words, the position of the line E represents the difference between the magnetomotive force provided by the control winding 28 and the magnetomotive force provided by the control winding 29. This particular relation may be obtained by the adjustment of adjustable resistances 33 and 34, or by the design of the control windings 28 and 29. The curve F represents the resultant magnetomotive force impressed on the core member 23 and is obtained by combining the curve D of Diagram II with the line E of Diagram III. It will be noted that the curve F intersects the zero axis at points $a$ and $b$. When the resultant magnetomotive force impressed on the core member 23 passes through zero corresponding to the position of the points $a$ and $b$, there will be induced in the winding 30 an alternating voltage of peaked wave form. Curve G of Diagram IV represents this voltage of peaked wave form. It should be understood that the curve G represents only the voltage impressed on control member 10 of electric valve 5 by the inductive device 18, and that corresponding voltages of peaked wave form are impressed on control members 10 of electric valves 6 and 7 by inductive devices 19 and 20. These latter voltages, of course, will be displaced in phase relation to the voltage G in accordance with the conventional three-phase system of voltages. The displacement $c$ of the curve G from the zero axis is effected by means of the battery 32. By virtue of the voltage of peaked wave form occurring at point $a$, the electric valve means 5 will be rendered conductive at this time so that there is impressed upon the load circuit 2 a voltage substantially equal to the corresponding position of the curve A. In like manner the voltages impressed upon control members 10 of electric valves 6 and 7 will render these valves conductive at times corresponding to the position of lines $d$ and $e$ so that there is impressed on the direct current circuit 2 a voltage which may be represented by curve H of Diagram V. Under these conditions it will be assumed that with the electric valve means 4 supplying a voltage as represented by curve H, the division of load between the electric valve means 4 and the rotary converter 3 will be substantially equal.

If it be assumed that for any reason the synchronous converter 3 begins to assume a greater portion of the load than that for which the control circuits 15, 16 and 17 have been adjusted, the energization of the control windings 29 of inductive devices 18, 19 and 20 will be increased to effect a decrease in the resultant unidirectional magnetomotive force impressed upon core members 23 of inductive devices 18, 19 and 20. Line J of Diagram VI represents the decreased undirectional magnetomotive force impressed on the core members of one of the inductive devices such as inductive device 18, and the curve K represents the resultant magnetomotive force impressed on the core member 23. It will be noted that the resultant magnetomotive force as represented by curve K intersects the zero axis at a point $f$ to effect an advancement in phase of the alternating voltage of peaked wave form induced in winding 30. This alternating voltage is represented by curve M of Diagram VII. By virtue of this decrease in the resultant magnetomotive force in the core member 23, the phase of the voltage of peaked wave form induced in winding 30 is advanced relative to the voltage impressed across anode 8 and cathode 9 of electric valve 5 by an angle corresponding to the distance between points $a$ and $f$. Coincidentally with this decrease in magnetomotive force in core member 23 of device 18, the core members 23 of inductive devices 19 and 20 will also experience similar effects and the alternating voltages impressed on control members 10 of electric valves 6 and 7 will be advanced in phase relative to the respective anode voltages so that the voltages impressed on the direct current circuit 2 by electric valve means 4 is increased to cause the electric valve means 4 to assume a larger portion of the load to effect thereby a reestablishment of the predetermined equal division of load. The curve N of Diagram VIII represents the voltage impressed on the direct current circuit 2 by the electric valve means 4 under the conditions set forth in Diagrams VI and VII.

Conversely, when the electric valve means 4 assumes a greater portion of the load than that for which the system is adjusted, the increased energization of windings 28 of inductive devices 18, 19 and 20 will increase the resultant unidirectional magnetomotive forces so that the voltages induced in the windings 30 are retarded in phase to reduce the voltage of the electric valve means 4. In this way, after an initial adjustment, the translating system will operate to maintain a predetermined division of load between the electric valve means 4 and the synchronous converter 3.

While for the purpose of explaining the operation of my invention I have chosen to describe the operation thereof when the system is considered to be transmitting energy from an alternating current circuit to a direct current circuit, it is to be understood that my invention may be employed to effect a predetermined division of load between the electric valve means 4 and the synchronous converter 3 when these elements are operating as inverters to transmit energy from a direct current circuit to an alternating current circuit.

While I have shown and described my invention as applied to a particular system of connections and as embodying various devices diagrammatically shown, it will be obvious to those skilled in that art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a supply circuit, a load circuit, a plurality of translating devices interposed in parallel relation between said circuits for transmitting energy therebetween and including at least one electric valve means having an anode, a cathode and a control member, and means for effecting a predetermined distribution of load between said electric valve means and the other of said translating devices comprising an inductive device for impressing on said control member an alternating voltage variable in phase relative to the voltage impressed across said anode and cathode conjointly in accordance with the current transmitted by said electrical valve means and the current transmitted by the other of said translating devices.

2. In combination, a supply circuit, a load circuit, electric valve means having an anode, a cathode and a control member and a dynamo-electric machine connected to operate in parallel to transmit energy between said circuits, and means for impressing on said control member an alternating voltage variable in phase relative to the voltage impressed across said anode and cathode conjointly in accordance with the load current of said electric valve means and the load current of said machine to maintain a predetermined division of load between said electric valve means and said machine.

3. In combination, a supply circuit, a load circuit, electric valve means having an anode, a cathode and a control member and a dynamo-electric machine interposed between said circuits and arranged to operate in parallel, and means for effecting a predetermined division of load between said electric valve means and said machine comprising an inductive device including a core member, a winding for impressing on said core member an alternating magnetomotive force, a control winding for impressing on said core member a unidirectional magnetomotive force which varies in accordance with an electrical condition of said electric valve means, a second control winding for impressing on said core member a second unidirectional magnetomotive force which opposes said first mentioned magnetomotive force and which varies in accordance with an electrical condition of said machine and a winding responsive to a magnetic condition of said core member for impressing on said control member an alternating voltage variable in phase relative to the voltage impressed across said anode and said cathode.

4. In combination, an alternating current circuit, a direct current circuit, an electric valve means having an anode, a cathode and a control member and a dynamo-electric machine interposed between said circuits and connected to operate in parallel, and means for effecting a predetermined division of load between said electric valve means and said dynamo-electric machine comprising an inductive device having a core member, a winding for impressing an alternating magnetomotive force on said core member, a control winding for impressing on said core member a unidirectional magnetomotive force which varies in magnitude in accordance with an electrical condition of said electric valve means, a second control winding for impressing on said core member a unidirectional magnetomotive force in opposition to said first mentioned unidirectional magnetomotive force which varies in magnitude in accordance with an electrical condition of said dynamo-electrical machine and a winding responsive to the resultant flux in said core member for impressing on said control member an alternating voltage the phase of which varies relative to the voltage impressed across said anode and said cathode to maintain said predetermined division of load.

5. In combination, an alternating current circuit, a direct current circuit, an electric valve means having an anode, a cathode and a control member and a synchronous converter connected in parallel relation between said circuits, and means for controlling said electric valve means to effect a predetermined division of load between said electric valve means and said synchronous converter comprising an inductive device having a core member, a winding for impressing on said core member an alternating magnetomotive force, a control winding for impressing on said core member a unidirectional magnetomotive force variable in magnitude in accordance with the current of said electric valve means, a second control winding for impressing on said core member a unidirectional magnetomotive force in opposition to said first mentioned magnetomotive force and variable in magnitude in accordance with the current of said synchronous converter and a winding responsive to a magnetic condition of said core member for impressing on said control member an alternating voltage of peaked wave form variable in phase relative to the voltage impressed across said anode and said cathode to maintain said predetermined division of load.

6. In combination, a supply circuit, a load circuit, electric valve means having an anode, a cathode and a control member and a dynamo-electric machine connected to operate in parallel to transmit energy between said circuits, and an inductive device having a core member including a saturable portion and a shunt magnetic path therefor, a winding for impressing an alternating magnetomotive force on said core member, a winding responsive to a magnetic condition of said saturable portion for providing an alternating voltage of peaked wave form and a pair of control windings for impressing opposing unidirectional magnetomotive forces on said core member to control the phase of said alternating voltage relative to the voltage impressed across said anode and said cathode conjointly in accordance with an electrical condition of said electric valve means and an electrical condition of said machine to maintain a predetermined division of load therebetween.

AUGUST SCHMIDT, Jr.